US008638667B2

(12) United States Patent
Shaffer et al.

(10) Patent No.: US 8,638,667 B2
(45) Date of Patent: Jan. 28, 2014

(54) TRANSMISSION PRIORITY PATHS IN MESH NETWORKS

(75) Inventors: Shmuel Shaffer, Palo Alto, CA (US); Jean-Philippe Vasseur, Saint Martin Duriage (FR); Sandeep J. Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 13/176,433

(22) Filed: Jul. 5, 2011

(65) Prior Publication Data

US 2013/0010798 A1 Jan. 10, 2013

(51) Int. Cl.
*H04L 12/28* (2006.01)

(52) U.S. Cl.
USPC ............ 370/235; 370/236; 370/237; 370/238

(58) Field of Classification Search
USPC ......... 370/235–238, 328, 231, 230, 243, 245, 370/248, 254; 709/230, 240
See application file for complete search history.

(56) References Cited

U.S. PATENT DOCUMENTS

| 6,320,845 | B1 | 11/2001 | Davie |
| 6,546,017 | B1 | 4/2003 | Khaunte |
| 7,339,893 | B2 | 3/2008 | Regal et al. |
| 7,630,312 | B1 | 12/2009 | Cheriton |
| 7,751,328 | B2 * | 7/2010 | Kloth ............................ 370/235 |
| 7,778,234 | B2 | 8/2010 | Cooke et al. |
| 7,778,248 | B2 | 8/2010 | Scudder et al. |
| 7,805,140 | B2 | 9/2010 | Friday et al. |
| 7,924,875 | B2 | 4/2011 | Gerstel |
| 7,970,893 | B2 | 6/2011 | Mohaban et al. |
| 2002/0087723 | A1 * | 7/2002 | Williams et al. ............... 709/240 |
| 2007/0025325 | A1 | 2/2007 | Kumar |
| 2008/0043638 | A1 * | 2/2008 | Ribiere et al. ................. 370/254 |

(Continued)

FOREIGN PATENT DOCUMENTS

| EP | 1356642 B1 | 9/2006 |
| EP | 1878146 B1 | 3/2011 |

OTHER PUBLICATIONS

"RPL: IPv6 Routing Protocol for Low Power and Lossy Networks" <draft-ietf-roll-rpt-19> by Winter, at al. (Mar. 13, 2011 version).

(Continued)

*Primary Examiner* — Robert Wilson
*Assistant Examiner* — Sai Aung
(74) *Attorney, Agent, or Firm* — Edwards Wildman Palmer LLP; James M. Behmke; Stephen D. LeBarron

(57) ABSTRACT

In one embodiment, a node may determine a trigger for establishing transmission priority on a path through a shared-media communication network for priority traffic to a particular node. As such, the node may generate a path clear message (PCM) that would instruct one or more receiving nodes along the path to suspend transmission for traffic other than the priority traffic for a specified duration, and also to transmit a local non-repeated distributed message to one or more neighbor nodes of each respective receiving node, the local non-repeated distributed message to instruct the neighbor nodes to suspend transmission for the specified duration. After transmitting the PCM along the path to the particular node to establish the transmission priority for the priority traffic along the path through the shared-media network, the priority traffic may be transmitted to the particular node along the path during the transmission priority.

20 Claims, 10 Drawing Sheets

(56) References Cited

U.S. PATENT DOCUMENTS

| | | | |
|---|---|---|---|
| 2009/0232001 A1* | 9/2009 | Gong et al. | 370/236 |
| 2009/0232114 A1* | 9/2009 | Barave et al. | 370/338 |
| 2010/0080126 A1* | 4/2010 | Higashida | 370/235 |

OTHER PUBLICATIONS

"Routing Metrics used for Path Calculation in Low Power and Lossy Networks" <draft-ieff-roll-routing-metrics-19> by Vasseur, et al. (Mar. 1, 2011 version).

"RPL Objective Function 0" <draft-ieff-roll-of0-11> by Thubert (May 5, 2011 version).

"The Minimum Rank Objective Function with Hysteresis" <draft-ietf-roll-minrank-hysteresis-of-03> by O. Gnawali et al. (May 3, 2011 version).

De Oliveira, et al., "LSP Preemption Policies for MPLS Traffic Engineering", Network Working Group, Internet Draft, draft-deoliveira-diff-te-preemption-06, Nov. 14, 2006, 19 pages, The Internet Society.

Patrice, et al., "Notification of Transmittal of the International Search Report and the Written Opinion of the International Searching Authority, or the Declaration", Patent Cooperation Treaty, Oct. 1, 2012, 15 pages, PCT/US2012/045531, European Patent Office, Rijswijk, Netherlands.

* cited by examiner

TRANSMISSION PRIORITY PATHS IN MESH NETWORKS

TECHNICAL FIELD

The present disclosure relates generally to computer networks, and, more particularly, to shared-media mesh networks, such as wireless and/or power-line communication (PLC) networks used, for example, in Smart Grid and Advanced Metering Infrastructure (AMI) technologies.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Further, shared-media communication networks, such as wireless and/or power-line communication (PLC) networks (a type of communication over power-lines), provide an enabling technology for networking communication and can be used, for example, in Advanced Metering Infrastructure (AMI) networks. However, due to the nature of shared-media communication, nodes must compete for transmission timing, and transmissions from different nodes, including neighboring nodes not along a chosen path between end-points of a traffic flow, may collide, rendering the transmission indecipherable by a node receiving the colliding transmissions. In particular, such collisions result in retransmissions (and possibly further collisions), extending the delay of associated with the traffic flow between the end-points.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
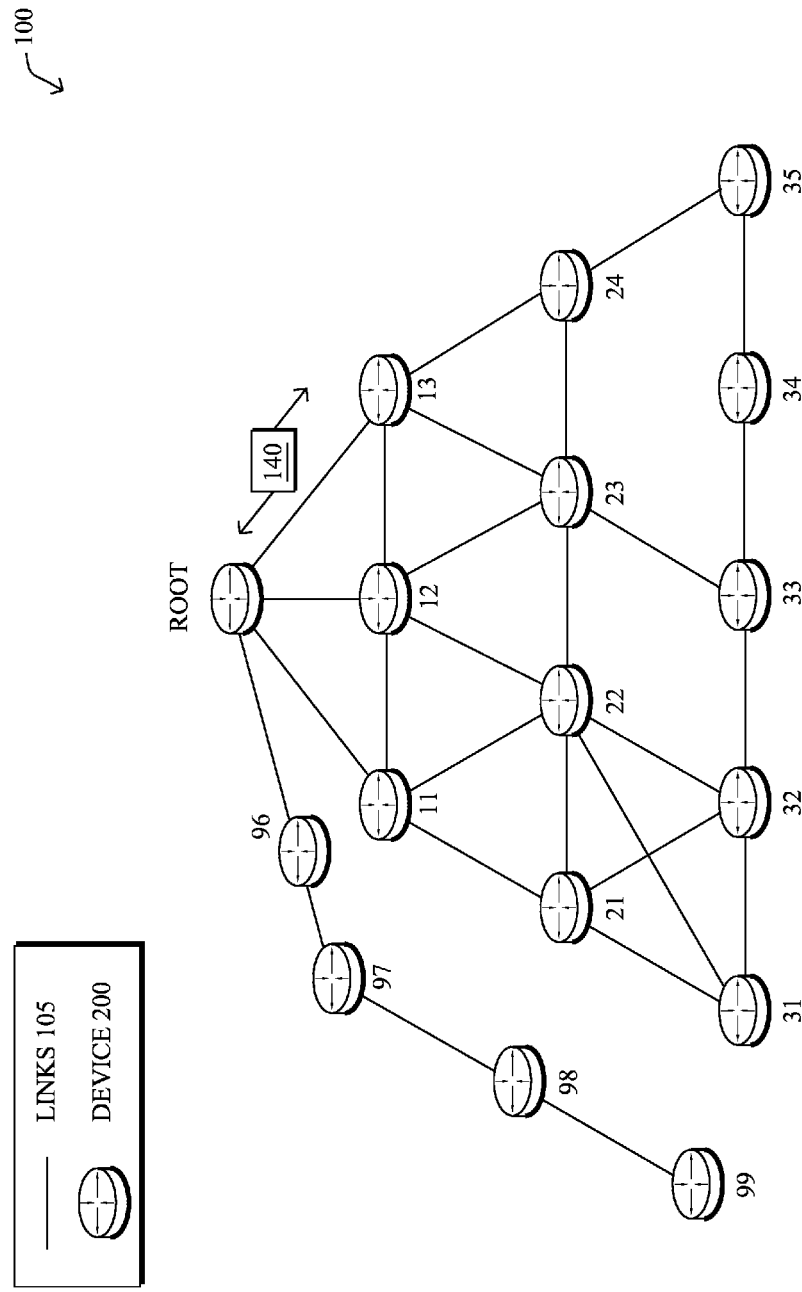
FIG. 1 illustrates an example communication network.

According to one or more embodiments of the disclosure, a node (e.g., source node) may determine a trigger for establishing transmission priority on a path through a shared-media communication network for priority traffic to a particular node. As such, the node may generate a path clear message (PCM) that would instruct one or more receiving nodes along the path to suspend transmission for traffic other than the priority traffic for a specified duration, and also to transmit a local non-repeated distributed message to one or more neighbor nodes of each respective receiving node, the local non-repeated distributed message to instruct the neighbor nodes to suspend transmission for the specified duration (e.g., so as to avoid packet transmission when the high priority traffic is being transmitted). After transmitting the PCM along the path to the particular node to establish the transmission priority for the priority traffic along the path through the shared-media network, the priority traffic may be transmitted to the particular node along the path during the transmission priority (e.g., with low delay and/or without interruption). According to one or more additional embodiments of the disclosure, receiving nodes receive and react to the PCMs, accordingly.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to is wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., described in FIG. 2 below and labeled is as shown: Root, 11, 12, . . . 35, and also 96-99) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
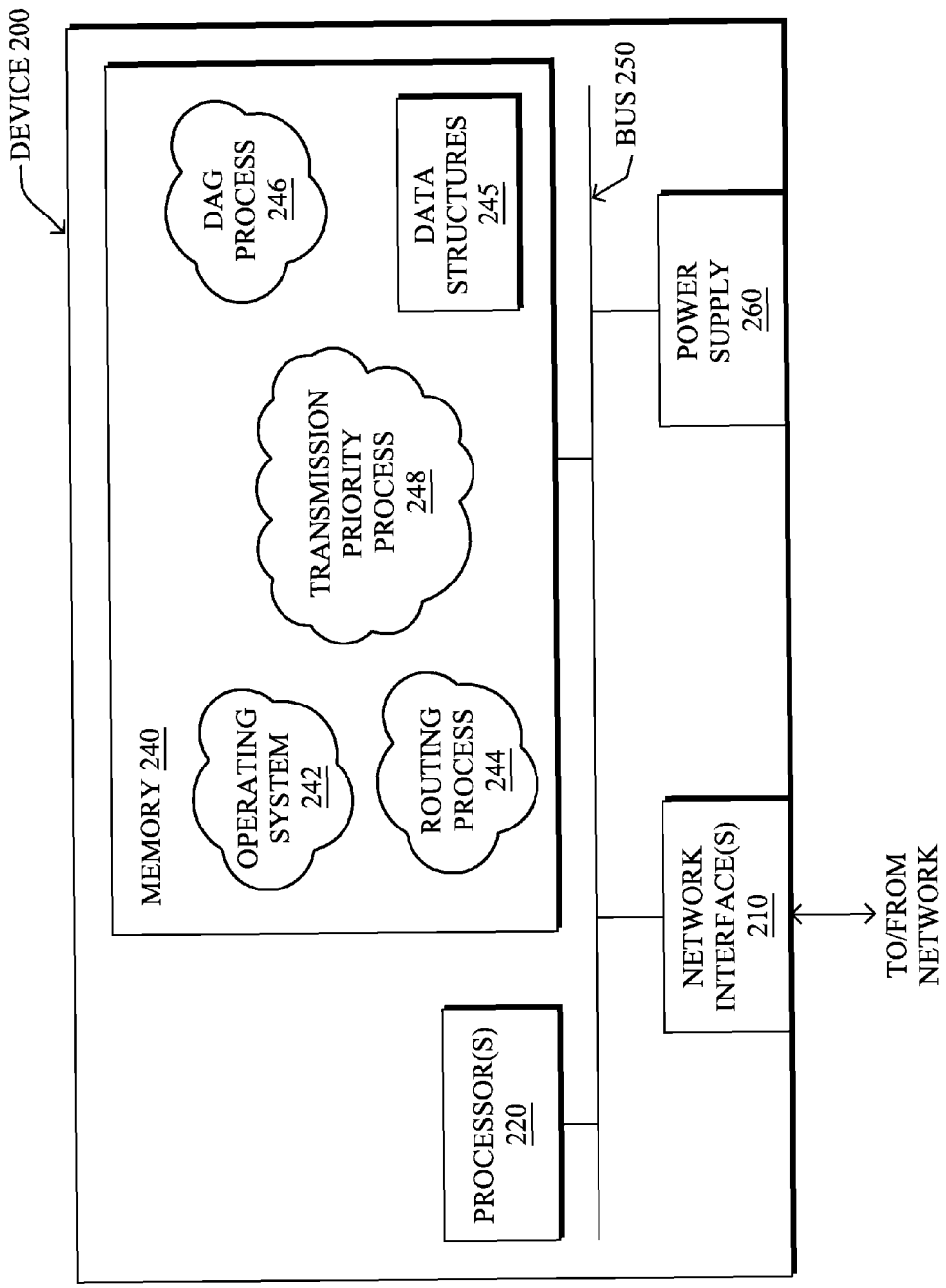
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by is the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative transmission priority process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of is network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of 0-11> by Thubert (May 5, 2011 version) and "The Minimum Rank Objective Function with Hysteresis"<draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
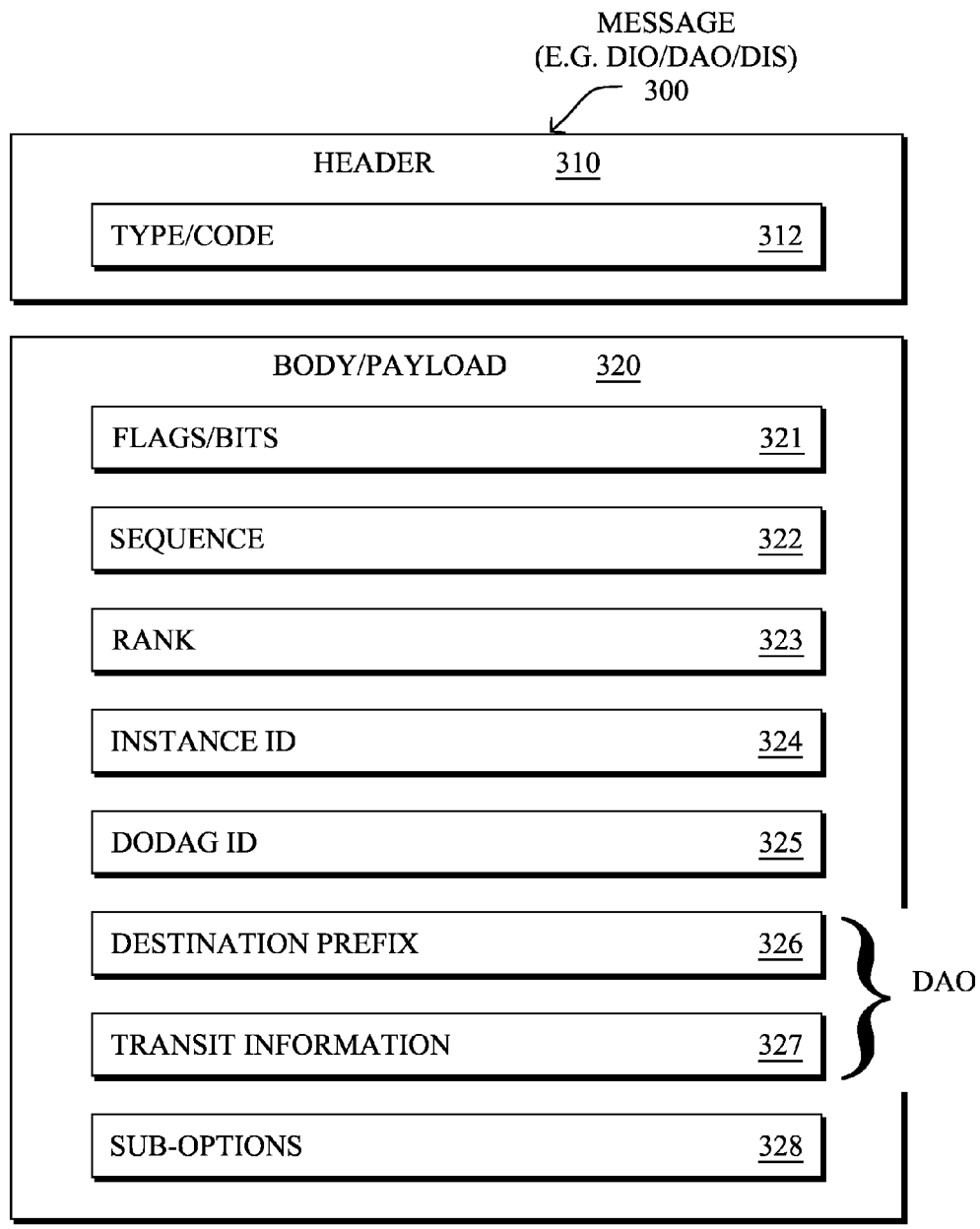
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
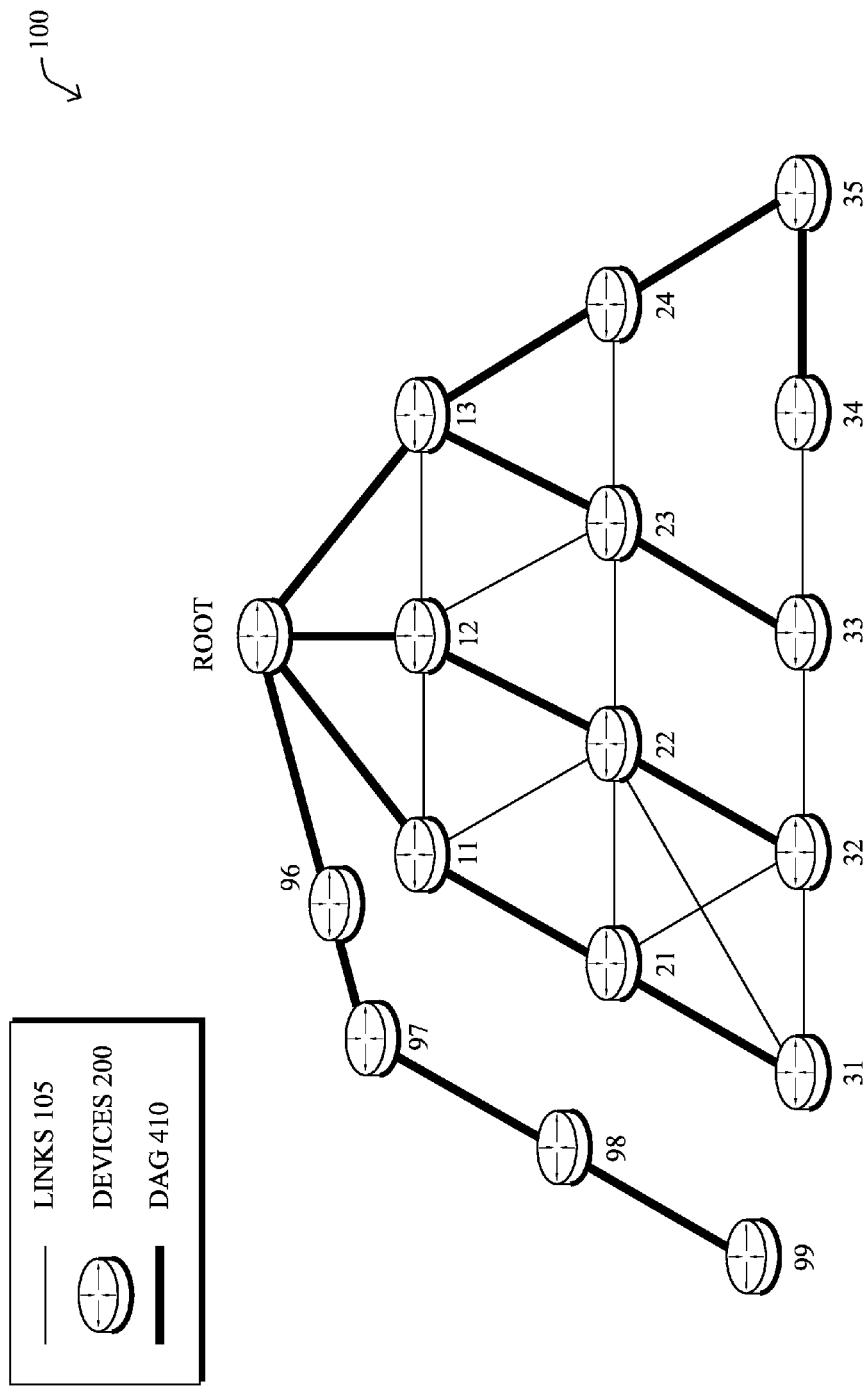
FIG. 4 illustrates an example directed acyclic graph (DAG) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, due to the nature of shared-media communication, nodes must compete for transmission timing, and transmissions from different nodes, including neighboring nodes not along a chosen path between end-points of a traffic flow, may collide, rendering the transmission indecipherable by a node receiving the colliding transmissions. In particular, such collisions result in retransmissions (and possibly further collisions), extending the delay of associated with the traffic flow between the end-points.

For instance, when a user who has a smart meter at his home calls a utility call center, the call center agent may need to gain timely access to the caller's smart meter. For example, the agent may need to send a sequence of messages to restart a process in the smart meter (remote reconnect) or alternatively upload data from the meter in order to identify and debug an issue the customer may be experiencing. Also, at other times an agent may decide that a specific smart meter is experiencing an issue which may require prompt downloading of a sizeable new configuration or code to that specific smart meter. Similarly, a meter's data or in general an urgent packet may need to be delivered with extreme urgency from point A to point B (e.g., a critical alarm or command sent by a sensor to an actuator for Distributed Automation). Such alarms may also have critical time delivery constraints.

As noted, in a mesh network such a message (packet) exchange between base station (e.g., at the live agent) and a meter usually needs to compete with other normal non-urgent traffic (e.g., meter data from various meters), which is also true for critical packets in the opposite direction (upstream). At times the increased volume of traffic between an agent and a specific smart meter may increase the overall packet flow, in some instances above the well-known efficient Aloha protocol threshold, effectively reducing the network bandwidth and increasing network delay. This may adversely affect customer satisfaction and the electrical network operation, because resolution of the issue the customer is calling about may be delayed as a result of suboptimal network performance.

Transmission Priority

The techniques herein may be used to allow the overall network 100 to operate with minimal interruption while dynamically providing preferential treatment to specific data flows between any two nodes (e.g., a base station/head-end application of an agent and a caller's specific smart meter) that desire to exchange critically important traffic. That is, the techniques herein may create a preferred low delay route in a mesh network, e.g., consequently increasing customer satisfaction by reducing the time it takes to resolve customer issues and improving the electric network operation.

Specifically, according to one or more embodiments of the disclosure as described in detail below, a node (e.g., source node) may determine a trigger for establishing transmission priority on a path through a shared-media communication network for priority traffic to a particular node. As such, the node may generate a path clear message (PCM) that would instruct one or more receiving nodes along the path to suspend transmission of traffic other than the priority traffic for a specified duration, and also to transmit a local non-repeated distributed message to one or more neighbor nodes of each respective receiving node, the local non-repeated distributed message to instruct the neighbor nodes to suspend transmission for the specified duration. After transmitting the PCM along the path to the particular node to establish the transmission priority for the priority traffic along the path through the shared-media network, the priority traffic may be transmitted to the particular node along the path during the transmission priority (e.g., with low delay and/or without interruption). According to one or more additional embodiments of the disclosure, receiving nodes receive and react to the PCMs, accordingly. Even though the illustration above describes the sequence as sending first the PCM and only later the high priority packets, those skilled in the art would recognize that the techniques herein may also cover also operations wherein the PCM message is issued after the high priority traffic started, is issued essentially at the same time as the starting of the high priority message and in a special case, when the high priority message carries the information (flag) which invokes the PCM messages to be issued by nodes along the path of the high priority message.

Existing systems may use a network-wide "stop transmitting" message, which can be sent from a head-end application to stop all devices/meters from sending any packets (such as meter data). However, such a system is maximally disruptive to the traffic of the entire network. The techniques herein, on the other hand, provide preferential treatment to specific data (packet) flows while maintaining normal flow through the majority of the network (e.g., mesh cell).

Illustratively, the techniques described herein may be performed by hardware, software, and/or firmware, such as in accordance with the transmission priority process 248, which may contain computer executable instructions executed by the processor 220 to perform functions relating to the novel techniques described herein, e.g., in conjunction with routing process 244. For example, the techniques herein may be treated as extensions to conventional transmission protocols, such as the various wireless communication and/or PLC protocols, and as such, may be processed by similar components understood in the art that execute those protocols, accordingly. Notably, the transmission priority process 248 may also (or alternatively) be embodied specifically within the network interfaces 210, such as where the wireless/PLC protocols are embodied in the interfaces, accordingly.

Operationally, a node, such as the root node or other source of traffic (or destination of traffic, notably), may determine/detect a trigger for establishing transmission priority on a path through a shared-media communication network 100 for priority traffic to (or from) a particular node. Various triggers may be used, such as an actual packet priority, a type of traffic, etc., or, more particularly, in response to a dynamically or manually implemented instruction to create the priority path.

For instance, in an illustrative example, when a customer places a call to a utility call center agent, the head-end system may utilize a user database to identify the network address of the caller's specific smart meter. Once the address of the specific meter is retrieved, the system identifies the path between the DAG root and the meter. In certain mesh networks, for example, the route between the root of the DAG 410 and any specific node is well known. This route is commonly used by the DAG root to specify the route a packet needs to traverse in order to arrive to a specific destination node. Note that this also applies to a path between a sensor raising an alarm and a destination node for the alarm in the network. Note that the techniques specified herein also apply to paths in the upstream direction (from a node to the DAG root) even if the path is not known a priori by the transmitting node and where packets are routed hop-by-hop.

In response to a need to invoke an urgent, e.g., high-volume, message exchange between the head-end application and the specific meter, such as a debugging application, the system may creates a preferred low delay route free of unimportant/non-urgent traffic to facilitate this exchange.

Figure 5:
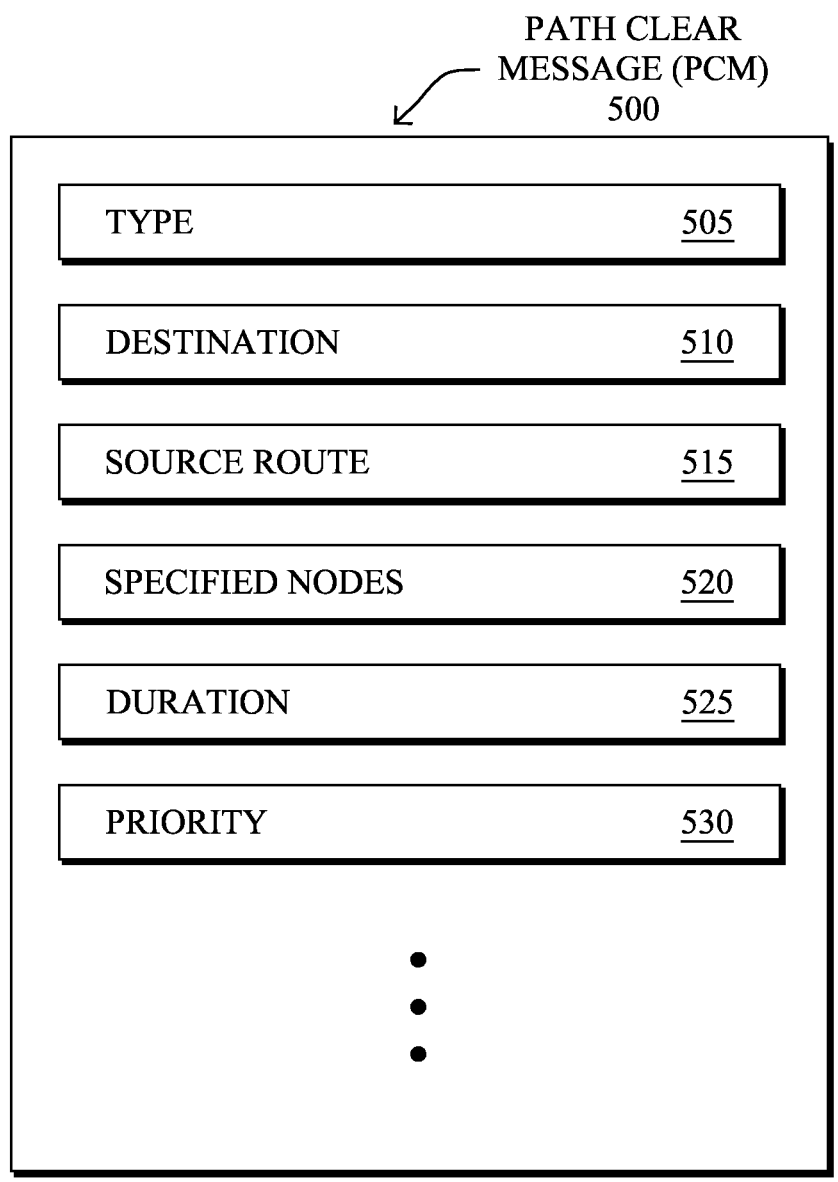
FIG. 5 illustrates another example message, e.g., a path clear message (PCM)

In accordance with one embodiment herein, the initiating node (e.g., root node, head-end, any other node in the network such as a meter or a sensor in the network, etc.) generates and sends a path clear message (PCM) towards the specific end-point device, e.g., smart meter or a head-end. FIG. 5 illustrates a simplified example of a PCM 500 that may be used in accordance with the techniques herein. The PCM is a hop-by-hop data message, e.g., with a newly specified extended header, and is processed by all nodes along the path between the source and destination of the priority traffic. Specifically, the PCM is used to instruct one or more receiving nodes along the path to suspend transmission for traffic other than the priority traffic for a specified duration. The PCM 500 also instructs the receiving nodes to transmit a local non-repeated distributed message to one or more neighbor nodes of each respective receiving node to thus instruct the neighbor nodes to suspend their transmissions for the specified duration as well.

As shown in FIG. 5, the PCM may illustratively comprise a type field 505, which may be used to indicate that the message is PCM, thus providing the instructions noted above, as well as the destination 510 of the desired priority path. If the PCM is sent using source routing (as understood in the art), then a source route field 515 may also be present (note that in the alternative, if the PCM 500 is to be processed hop-by-hop, a "router alert" option may replace the source route field in the packet, as may also be appreciated by those skilled in the art). In addition, as described herein, other various fields, such as specified receiving nodes 520, a duration field 525, and a priority field 530 may also be present within the PCM.

Figure 6:
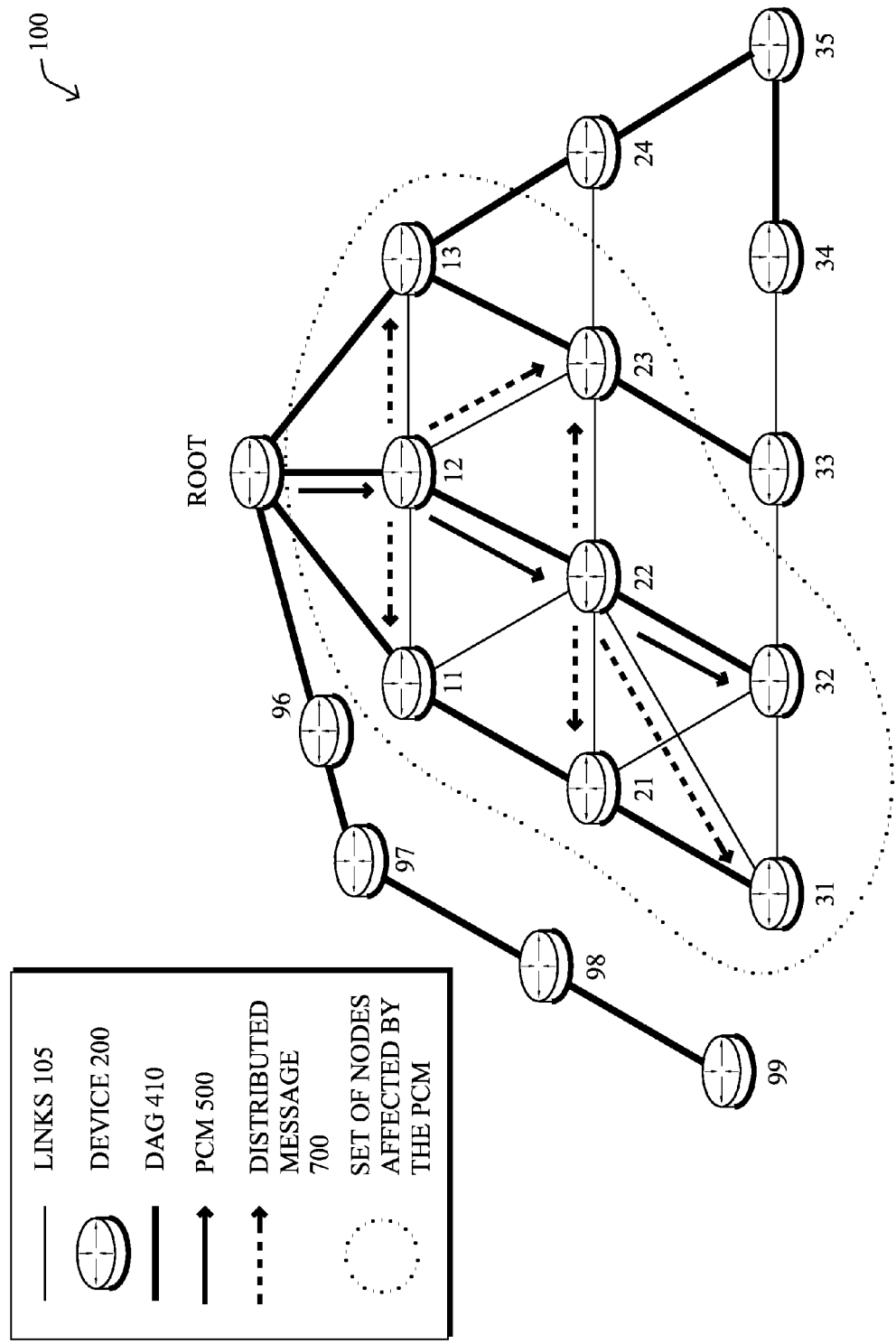
FIG. 6 illustrates an example progression of the PCM.

FIG. 6 illustrates the PCM being transmitted along the path from the root node to an illustrative end-point node, e.g., node 32, to establish the transmission priority for the priority traffic along the path through the shared-media network 100. In particular, upon receiving the PCM 500, all intermediate nodes enroute to the specific node/meter (e.g., nodes 12 and 22) transmit a local non-repeated distributed message 700, such as a local broadcast (or multicast) message, to its neighbor nodes (e.g., neighbor nodes 11, 13, and 23 for node 12, and neighbor nodes 21, 23, and 31 for node 22). Note that a neighbor node may receive more than one copy of a message 700 (e.g., node 11), though not shown for clarity. Also, intermediate nodes receiving the PCM 500 may also receive the messages 700. However, in either of these circumstances, the message 700 (duplicate to another message 700 or a PCM 500) may simply be ignored.

Figure 7:
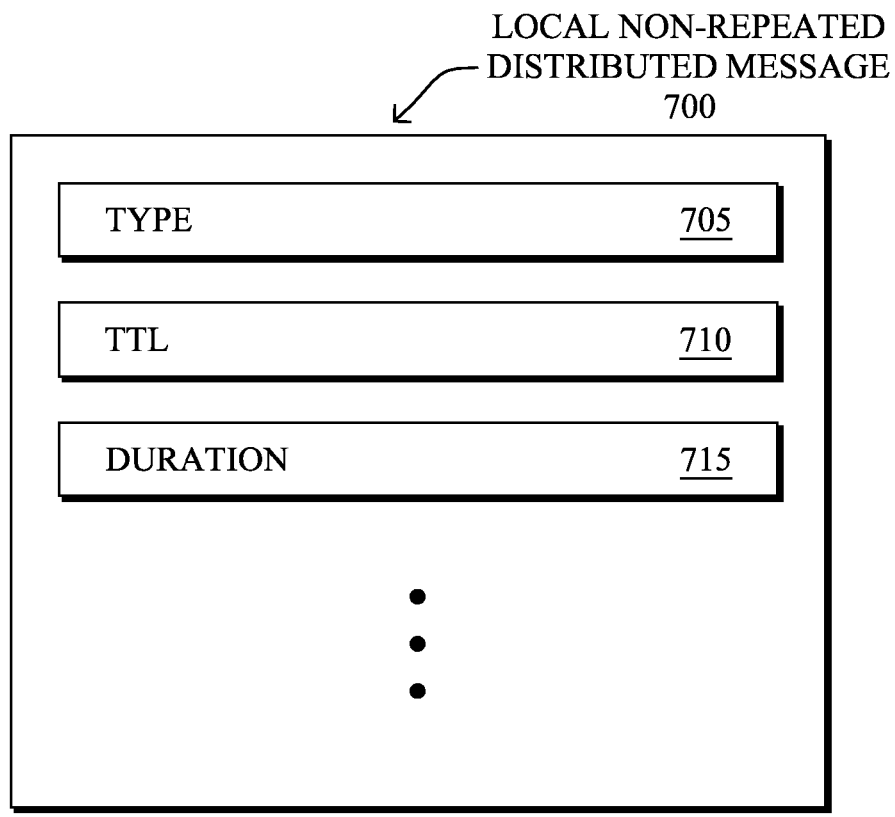
FIG. 7 illustrates another example message, e.g., a distributed message.

FIG. 7 illustrates an example simplified local non-repeated distributed message 700 (e.g., broadcast message), which may comprise a type field 705, a time-to-live (TTL) field 710, and a duration field 715. For example, to ensure the message 700 is not repeated, the TTL value may be set to "1", such that any receiving neighbor node knows not to propagate the message any further into the network. Also, by using the type field 705 to indicate the local non-repeated distributed message 700, the receiving neighbor nodes may thus be instructed to suspend their transmission for the specified duration 715.

Note that in a specific embodiment, the duration for suspending the transmission is carried as part of the PCM 500, i.e., duration field 525, and also in message 700, i.e., duration field 715. Alternatively, the specified duration may be configured within the shared-media network in advance of any PCMs, such as per the DAG characteristics, or else a default value programmed into the devices themselves. If the specified duration is not specified within the PCM, then in one embodiment, the duration configured within the shared-media network in advance of any PCMs may be used.

Returning to FIG. 6 above, the distributed messages 700 are received by nodes 11, 13, 21, 23, and 31. Since this message 700 is a non-repeated message (e.g., is a broadcast/multicast message with TTL=1), as a result these neighbor nodes will suspend their transmission for a predefined period/duration of time. In this manner, the transmission priority is granted to the traffic flow to follow, thus, in essence, "reserving" the path between the source and destination of the flow.

Figure 8:
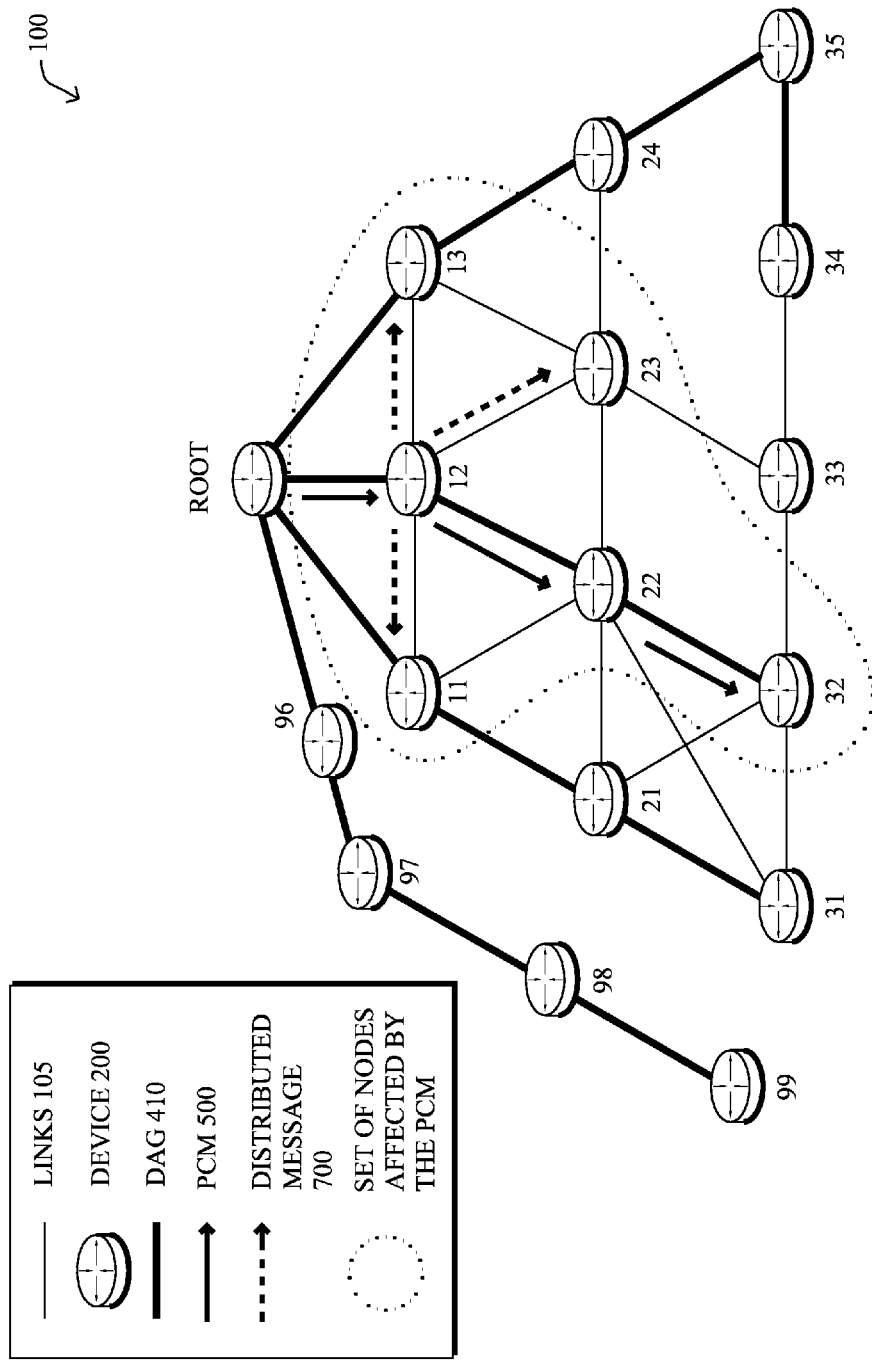
FIG. 8 illustrates an alternative example progression of the PCM.

Notably, in accordance with another embodiment, the DAG root may send a PCM 500 which specifies only a limited number of nodes along the path which need to propagate the distributed message 700. That is, the node initiating the PCM may specify particular receiving nodes to transmit the local non-repeated distributed message 700, such that other nodes that receive the PCM that are not specified are thus configured to not transmit a local non-repeated distributed message. For example, as shown in FIG. 8, assume that via specific nodes field 520, the PCM 500 has indicated that only node 12 need participate in the transmission priority algorithm (e.g., since nodes closer to the root are often more subject to collisions). Alternatively, such a specification of particular nodes to participate may be made in advance of any PCM, such as through static or dynamic node configuration (e.g., based on DAG characteristics, such as depth in the DAG, a number of children, a number of neighbors, etc.). A node receiving the PCM 500 may thus determine whether it is specified as a particular receiving node to transmit the local non-repeated distributed message 700, accordingly.

Once the transmission priority is established on the "priority path," the source node (or the head-end of the priority path) may transmit the corresponding priority traffic (e.g., packets 140) to the particular end-point node (e.g., node 32) along the path during the transmission priority. Any intermediate device (e.g., nodes 12 and 22) may then receive the priority traffic, and transmits it toward the particular node along the path during the transmission priority. Note that in this manner, all other nodes in the network are unaffected (e.g., in the example, nodes 24, 34, and 35, and more particularly, nodes 96, 97, 98, and 99—note that node 33 may be affected since its parent may stop forwarding messages to/from it). It should also be noted that, in general, the number of unaffected nodes in a normal mesh network may be significantly greater than the number of affected nodes using the focused transmission priority path techniques described herein.

In accordance with a specific implementation, the system may send a message that returns the network to normal operation mode (i.e., stopping the clear path mode of operation). In particular, a transmission priority clearing message may be transmitted along the path in response to completion of the transmission priority (e.g., a time period or completion of the traffic flow). The transmission priority clearing message, such as a redefined PCM 500 (with a different type 505) may be used to thus instruct the receiving nodes along the path to resume transmission for other traffic. These node may also be instructed to transmit a second local non-repeated distributed message 700 to the neighbor nodes of each respective receiving node to instruct the neighbor nodes to resume transmission (e.g., again with a different type 705). In response to receiving such a message, a receiving node resumes transmission for its traffic, and transmits the second local non-repeated distributed message to its neighbor nodes, accordingly.

Alternatively or in addition, each node may keep track of the length of time it has been placed in a transmission suspension ("silent") mode. In accordance with a specific embodiment, if a node is placed in a silent mode for longer than an allowed period of time, the node may automatically exit the silent mode, and starts to send and receive packets in accordance with the normal operating procedure. Said differently, the receiving nodes and the neighbor nodes of each respective receiving node are configured to resume transmission in response to expiration of a configured timer. While a node is in silent mode, received traffic may accordingly be buffered for future transmission.

Note that in the event a plurality of PCMs 500 are received by a particular node, such PCMs may be prioritized. For example, there may be certain instances where transmission priority paths are requested for overlapping paths (i.e., common nodes), or else multiple paths are parallel to each other within a single hop (e.g., a TTL=1), and as such competition for the network's resources could still occur. If a node is already in the "silent" mode and receives a second PCM from a second node requesting a "clear path," there are a few available options:

(1) The node could return a NACK. In the event the set of nodes visited by the PCM is recorded, then upon receiving the NACK, the second node could resend a second PCM including a set of nodes to avoid (e.g., using source routing field 515). Note that in this mode, the NACK packet from the silent node may collide with the high priority data flow, and as such, may be less preferred.

(2) The node could simply drop the second PCM and buffer the packets sent by the second node until it exits from the silent mode.

(3) The node could exit the first silent mode, and return to a conventional (competing, potentially colliding) mode. For instance, this may be useful where it is better to add a slight delay to both priority traffic flows, rather than completely stalling a second flow until a first flow is completed.

The selection of which particular option is used in a particular network may be based on particular circumstances, such as node locations, priority levels or types of the traffic, etc.

Figure 9:
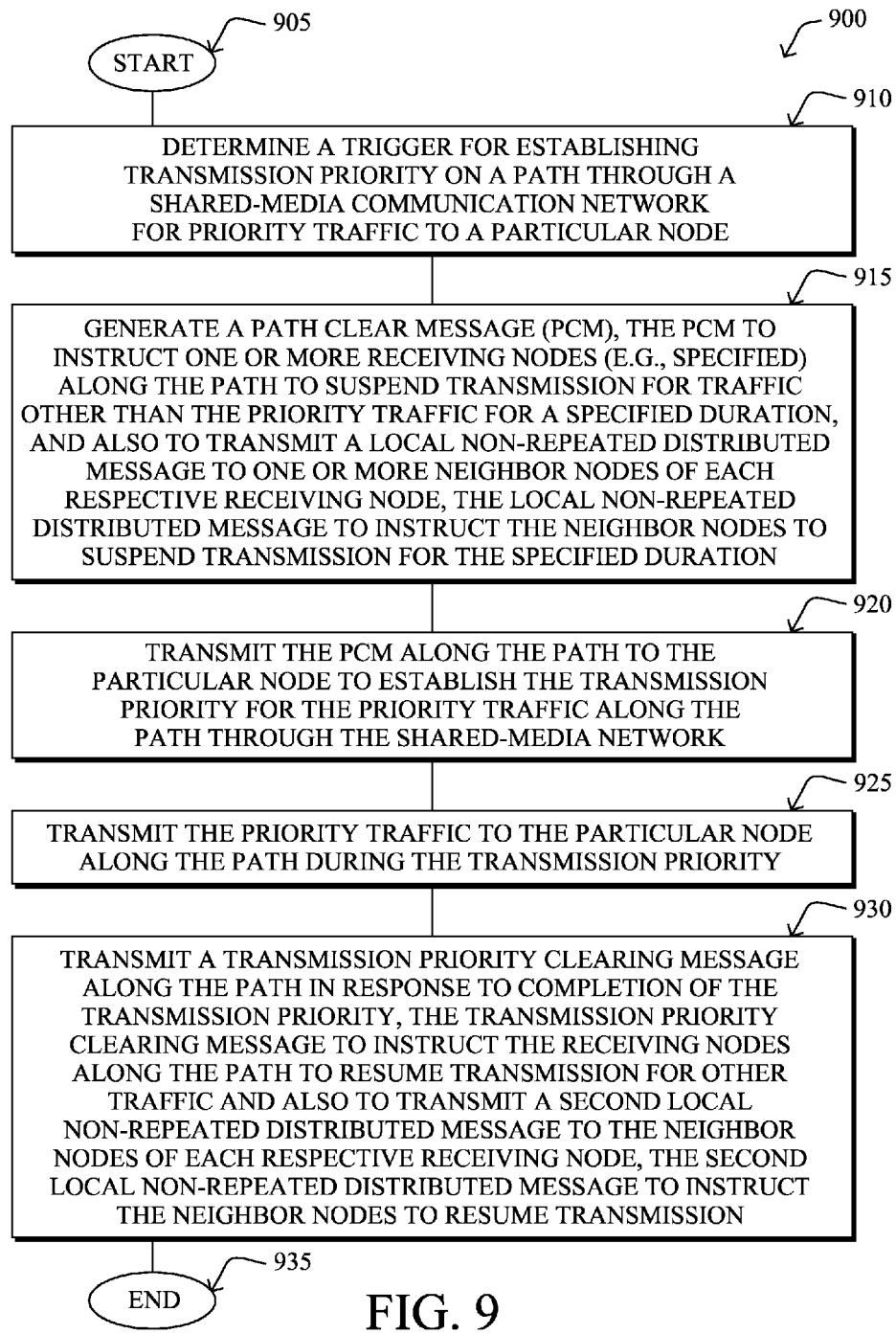
FIG. 9 illustrates an example simplified procedure for transmission priority in a shared-media communication network.

FIG. 9 illustrates an example simplified procedure for transmission priority in a shared-media communication network in accordance with one or more embodiments described herein, e.g., from the perspective of a source node (or other node initiating the transmission priority path). The procedure 900 starts at step 905, and continues to step 910, where, as described in greater detail above, a node (e.g., the root node) may determine a trigger for establishing transmission priority on a path through a shared-media communication network 100 for priority traffic to a particular node (e.g., node 32). As such, in step 915, the node may generate a PCM 500, which, as described above, is to instruct one or more receiving nodes along the path (e.g., nodes 12 and 22) to suspend transmission for traffic other than the priority traffic for a specified duration, and also to transmit a local non-repeated distributed message 700 to one or more (e.g., all) neighbor nodes of each respective receiving node, the local non-repeated distributed message to instruct the neighbor nodes to suspend transmission for the specified duration. Note that as mentioned above (e.g., with reference to FIG. 8), particular receiving nodes (e.g., node 12) may be specified to participate in the transmission priority, accordingly.

In step 920, the node transmits the PCM 500 along the path to the particular node to establish the transmission priority for the priority traffic along the path through the shared-media network, and then in step 925 may begin to transmit the priority traffic to the particular node along the path during the transmission priority. In a specific embodiment, in step 930 it may be possible for the node to transmit/send a transmission priority clearing message along the path in response to completion of the transmission priority, where, as mentioned above, the transmission priority clearing message is to instruct the receiving nodes along the path to resume transmission for other traffic and also to transmit a second local non-repeated distributed message to the neighbor nodes of each respective receiving node, the second local non-repeated distributed message to instruct the neighbor nodes to resume transmission. The procedure 900 ends in step 935.

Figure 10:
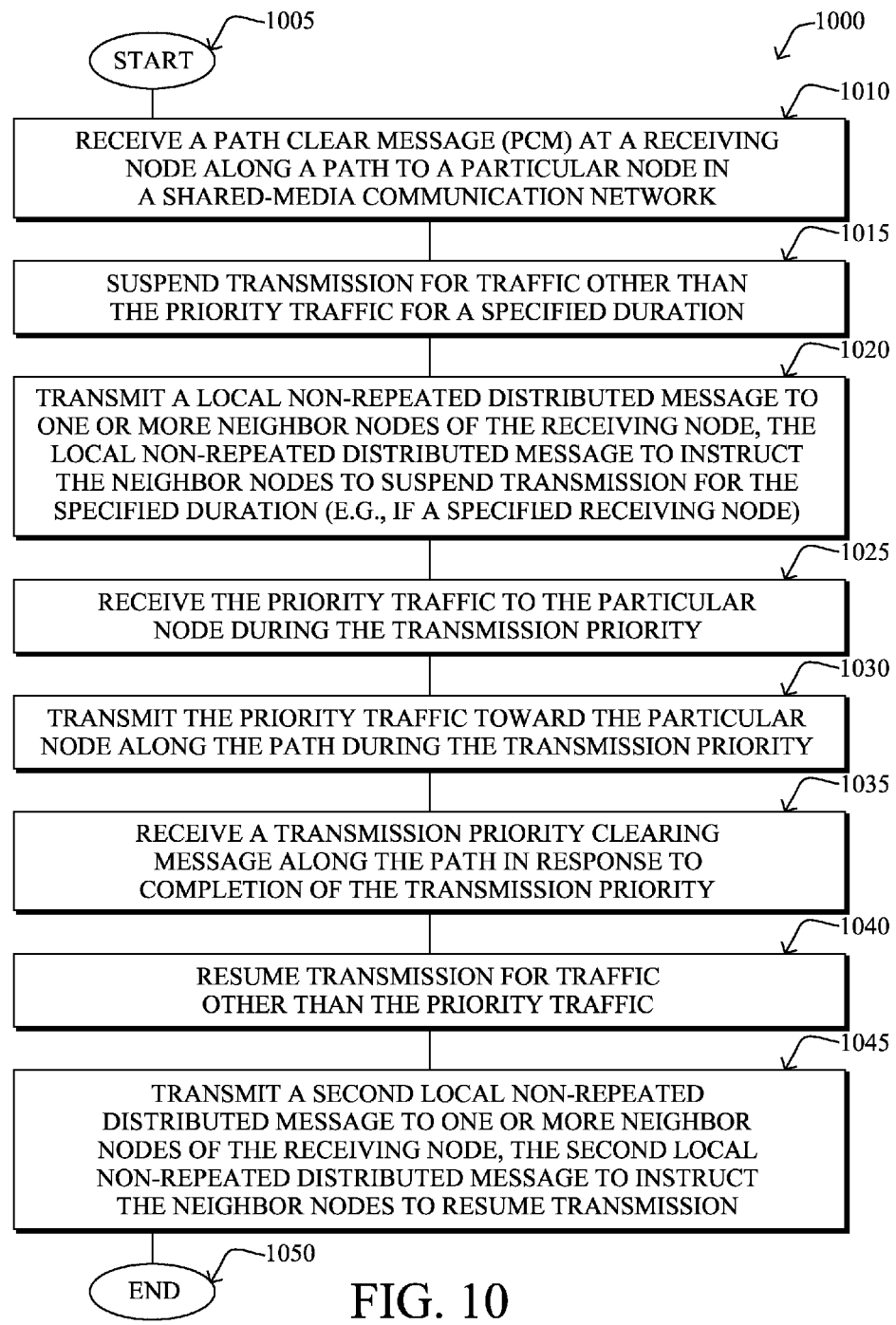
FIG. 10 illustrates another example simplified procedure for transmission priority in a shared-media communication network.

In addition, FIG. 10 illustrates another example simplified procedure for transmission priority in a shared-media communication network in accordance with one or more embodiments described herein, e.g., from the perspective of a receiving node along the path. The procedure 1000 starts at step 1005, and continues to step 1010, where, as described in greater detail above, a PCM 500 is received at a receiving node (e.g., node 12) along a path to a particular node (e.g., node 32) in a shared-media communication network 100. In response, in step 1015 the receiving node suspends transmission for traffic other than the priority traffic for a specified duration, and also in step 1020 transmits a local non-repeated distributed message 700 to one or more (e.g., all) neighbor nodes (e.g., nodes 11, 13, 23, etc.) of the receiving node, the local non-repeated distributed message to instruct the neighbor nodes to suspend transmission for the specified duration. The root node and node 22 may receive the PCM message as well, but ignore it as they are on the path traversed by the high priority message. Note that as mentioned above, the receiving node may first determine whether it is a specified receiving node that has actually been requested to participate in the transmission priority along the path.

In step 1025 the receiving node may receive the priority traffic to the particular node during the transmission priority, and as such, in step 1030 transmits the priority traffic toward the particular node along the path during the transmission priority. If in response to receiving a transmission priority clearing message along the path in response to completion of the transmission priority in step 1035, or else in response to the end of the transmission priority duration, then in step 1040 the receiving node resumes its regular transmission for traffic other than the priority traffic. Note that at this time, in certain embodiments, in step 1045 the receiving node may also explicitly transmit a second local non-repeated distributed message to its neighbor nodes to also instruct those neighbor nodes to resume transmission as well. The procedure 1000 ends in step 1050.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the two procedures are not meant to be mutually exclusive.

The novel techniques described herein, therefore, provide for transmission priority in a shared-media communication network. In particular, the techniques herein may be used to create a preferred low delay route in a mesh network. For instance, the techniques herein may:

1) provide for creating a high priority path with low delay between a head-end application and a specific smart meter or intelligent device such as a sensor (or in the opposite direction);
2) minimize network collisions for all high priority packets traveling between the head-end application and the relevant smart meter;
3) define a new message flow for establishing a high priority path with low delay between the root of the DAG and any node (smart meter) in the network;
4) affect only nodes which may interfere with the urgent message flow, where other nodes may continue normal operations such as sending and receiving packets (e.g., meter data);
5) identify the nodes which should enter the silent mode of operation explicitly by being on the path between the root and the specific meter;
6) explicitly identify only a subset of nodes from the set described in #5 above as required to enter the silent mode of operation;
7) facilitate a mode of operation where nodes which have been placed in a silent mode for a long period of time can automatically return to the normal mode of operation; and
8) improve customer satisfaction by reducing the time agents take to resolve customer issues in real time interactions and improve the electric grid network operation.

Note that the techniques herein are not the same as wireless standards that define a "request to send" and "clear to send" (RTS/CTS) protocol. In particular, an RTS/CTS protocol allows each node to define a lockout time for each particular frame transmission. For example, if a node has to transmit a frame, to avoid collision during the transmission of that frame, the node may broadcast an RTS message into the network, and upon receipt of a CTS message, the transmitting node should be free of interference for the duration of the frame. However, such an approach is per-hop and per-frame based, not traffic flow based. As such, exceptional delays may still result while each node awaits its turn to transmit each frame of the traffic. The techniques herein, on the other hand, essentially "reserves" the path from the source to the endpoint, such that no (or minimal) delay is experienced for each transmission of each frame of the priority traffic.

Note also that standard quality of service (QoS) techniques are also not sufficient to meet the objective of the techniques herein. For instance, while QoS does help prioritize traffic, such as through packet coloring, queuing discipline, congestion avoidance, etc., it would not help in this particular case as QoS does not stop nodes from sending non-urgent traffic on shared media and potentially causing collisions with the higher priority traffic. Indeed, when a node has to send some high priority traffic along a path, QoS can be used to give a precedence to this critical traffic over low priority traffic on a per node basis. As just mentioned, however, this does not prevent other nodes from sending traffic. For example, nothing would prevent node 21 from sending traffic even if node 22 is using QoS techniques, which would result in a collision. Again, the aim of the techniques herein is to make sure that other nodes do not send traffic for some specified duration period to give transmission priority to a particular traffic flow.

While there have been shown and described illustrative embodiments that provide transmission priority in a shared-media communication network, it is to be understood that various other adaptations and modifications may be made within the spirit and scope of the embodiments herein. For example, the embodiments have been shown and described herein with relation to LLNs, such as for AMIs and/or sensor networks. However, the embodiments in their broader sense are not as limited, and may, in fact, be used with other types of shared-media networks and/or protocols. In addition, while certain protocols are shown, such as RPL, other suitable protocols may be used, accordingly. Moreover, while the techniques are shown and described with relation to DAG topologies, any routing topology may take advantage of the techniques herein.

Furthermore, for ease of explanation the foregoing description has been illustrated with respect to a local non-repeated distributed message 700 which cause nodes to stop sending messages. The techniques herein, however, may also include a system wherein the local non-repeated distributed message 700 may just slow and/or limit the number of messages a "silent" node may send. For example a silent node may drastically slow down its transmission rate and, e.g., attempt to send only a single packet once every minute, in order to reduce (as opposed to completely avoid) potential collisions with the high priority traffic.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a trigger for establishing transmission priority on a path through a shared-media communication network for priority traffic to a particular node, wherein the trigger is determined to have occurred when a particular data flow has been received at a root node;
    in response to determining that the trigger has occurred at the root node, generating a path clear message (PCM), the PCM sent to each node along the path to instruct nodes each node along the path to suspend transmission for traffic other than the priority traffic for a specified duration, and also to transmit a local non-repeated distributed message to one or more neighbor nodes of each respective node along the path, the local non-repeated distributed message to instruct the neighbor nodes to suspend transmission for the specified duration;
    transmitting a transmission priority clearing message along the path in response to completion of the transmission priority, the transmission priority clearing message to instruct the each node along the path to resume transmission for other traffic and also to transmit a second local non-repeated distributed message to the neighbor nodes of each respective node along the path, the second local non-repeated distributed message to instruct the neighbor nodes to resume transmission;
    transmitting the PCM along the path to the particular node to establish the transmission priority for the priority traffic along the path through the shared-media network; and
    transmitting the priority traffic to the particular node along the path during the transmission priority.

2. The method as in claim 1, wherein the specified duration is carried within the PCM.

3. The method as in claim 1, wherein the specified duration is configured within the shared-media network in advance of any PCMs.

4. The method as in claim 1, wherein the local non-repeated distributed message is one of either a broadcast message or a multicast message, and wherein the local non-repeated distributed message has a time-to-live (TTL) value of "1".

5. The method as in claim 1, further comprising:
    specifying particular receiving nodes to transmit the local non-repeated distributed message, wherein other receiving nodes not specified along the path that receive the PCM are configured to not transmit the local non-repeated distributed message.

6. The method as in claim 5, wherein the specifying comprises including an indication of the particular receiving nodes within the PCM.

7. The method as in claim 1, wherein the each node along the path and the neighbor nodes of each respective node along the path are configured to resume transmission in response to expiration of a configured timer.

8. The method as in claim 1, wherein the suspending transmission as instructed by the PCM comprises reducing a rate at which traffic other than the priority traffic is transmitted.

9. An apparatus, comprising:
    one or more network interfaces to communicate in a shared-media computer network;
    a processor coupled to the network interfaces and configured to execute one or more processes; and
    a memory configured to store a process executable by the processor, the process when executed operable to:
    determine a trigger for establishing transmission priority on a path through a shared-media communication network for priority traffic to a particular node, wherein the trigger is determined to have occurred when a particular data flow has been received at a root node;
    generate a path clear message (PCM) in response to a determination that the trigger has occurred at the root node, the PCM sent to each node along the path to instruct one or more each node along the path to suspend transmission for traffic other than the priority traffic for a specified duration, and also to transmit a local non-repeated distributed message to one or more neighbor nodes of each respective node along the path, the local non-repeated distributed message to instruct the neighbor nodes to suspend transmission for the specified duration;
    transmit a transmission priority clearing message along the path in response to completion of the transmission priority, the transmission priority clearing message to instruct each node along the path to resume transmission for other traffic and also to transmit a second local non-repeated distributed message to the neighbor nodes of each respective node along the path, the second local non-repeated distributed message to instruct the neighbor nodes to resume transmission;
    transmit the PCM along the path to the particular node to establish the transmission priority for the priority traffic along the path through the shared-media network; and
    transmit the priority traffic to the particular node along the path during the transmission priority.

10. The apparatus as in claim 9, wherein the process when executed is further operable to:
    specify particular receiving nodes to transmit the local non-repeated distributed message, wherein other receiving nodes not specified along the path that receive the PCM are configured to not transmit the local non-repeated distributed message.

11. The apparatus as in claim 9, wherein each node along the path and the neighbor nodes of each respective node along the path are configured to resume transmission in response to expiration of a configured timer.

12. A method, comprising:
    receiving, from a root node in response to a particular data flow being received at the root node, a path clear message (PCM) at a receiving node along a path to a particular node in a shared-media communication network, the PCM to instruct the receiving node to suspend transmission for traffic other than the priority traffic for a specified duration, and also to transmit a local non-repeated distributed message to one or more neighbor nodes of the receiving node, the local non-repeated distributed message to instruct the neighbor nodes to suspend transmission for the specified duration;
    in response to the PCM: suspending transmission for traffic other than the priority traffic for the specified duration, and transmitting the local non-repeated distributed message to one or more neighbor nodes of the receiving node, the local non-repeated distributed message to instruct the neighbor nodes to suspend transmission for the specified duration;
    receiving a transmission priority clearing message along the path in response to completion of the transmission priority, the transmission priority clearing message to instruct the receiving node to resume transmission for other traffic and also to transmit a second local non-repeated distributed message to the neighbor nodes of each respective receiving node, the second local non-repeated distributed message to instruct the neighbor nodes to resume transmission; and in response to the transmission priority clearing message: resuming transmission for traffic other than the priority traffic, and transmitting the second local non-repeated distributed message to one or more neighbor nodes of the receiving node, the second local non-repeated distributed message to instruct the neighbor nodes to resume transmission;

receiving the priority traffic to the particular node during the transmission priority; and transmitting the priority traffic toward the particular node along the path during the transmission priority.

13. The method as in claim 12, further comprising:
determining whether the specified duration is specified within the PCM; and
if not specified in the PCM, using a duration configured within the shared-media network in advance of any PCMs.

14. The method as in claim 12, wherein the local non-repeated distributed message is one of either a broadcast message or a multicast message, and wherein the local non-repeated distributed message has a time-to-live (TTL) value of "1".

15. The method as in claim 12, further comprising:
determining whether the receiving node is specified as a particular receiving node to transmit the local non-repeated distributed message, wherein other receiving nodes not specified along the path that receive the PCM are configured to not transmit the local non-repeated distributed message.

16. The method as in claim 12, wherein the receiving node and the neighbor nodes of each respective receiving node are configured to resume transmission in response to expiration of a configured timer.

17. The method as in claim 12, further comprising:
prioritizing between a plurality of PCMs.

18. The method as in claim 12, further comprising:
buffering non-priority traffic for transmission after the transmission priority.

19. The method as in claim 12, wherein the suspending transmission as instructed by the PCM comprises reducing a rate at which traffic other than the priority traffic is transmitted.

20. An apparatus, comprising:
one or more network interfaces to communicate in a shared-media computer network;
a processor coupled to the network interfaces and configured to execute one or more processes; and
a memory configured to store a process executable by the processor, the process when executed operable to:
receive, from a root node in response to a particular data flow being received at a root node, a path clear message (PCM) at the apparatus as a receiving node along a path to a particular node in a shared-media communication network, the PCM to instruct the receiving node to suspend transmission for traffic other than the priority traffic for a specified duration, and also to transmit a local non-repeated distributed message to one or more neighbor nodes of the receiving node, the local non-repeated distributed message to instruct the neighbor nodes to suspend transmission for the specified duration;
in response to the PCM: suspend transmission for traffic other than the priority traffic for the specified duration, and transmit the local non-repeated distributed message to one or more neighbor nodes of the receiving node, the local non-repeated distributed message to instruct the neighbor nodes to suspend transmission for the specified duration;
receive a transmission priority clearing message along the path in response to completion of the transmission priority, the transmission priority clearing message to instruct the receiving node to resume transmission for other traffic and also to transmit a second local non-repeated distributed message to the neighbor nodes of each respective receiving node, the second local non-repeated distributed message to instruct the neighbor nodes to resume transmission; and in response to the transmission priority clearing message: resuming transmission for traffic other than the priority traffic, and transmitting the second local non-repeated distributed message to one or more neighbor nodes of the receiving node, the second local non-repeated distributed message to instruct the neighbor nodes to resume transmission;
receive the priority traffic to the particular node during the transmission priority; and
transmit the priority traffic toward the particular node along the path during the transmission priority.

* * * * *

UNITED STATES PATENT AND TRADEMARK OFFICE
CERTIFICATE OF CORRECTION

PATENT NO. : 8,638,667 B2  
APPLICATION NO. : 13/176433  
DATED : January 28, 2014  
INVENTOR(S) : Shmuel Shaffer et al.

Page 1 of 1

It is certified that error appears in the above-identified patent and that said Letters Patent is hereby corrected as shown below:

In the Specification

Column 2, line 35, please amend as shown:
   from local area networks (LANs) to[[ is]] wide area networks Column 3, line 8, please amend as shown:
   200 (e.g., described in FIG. 2 below and labeled[[ is]] as shown:

Column 3, line 49, please amend as shown:
   that are addressable by[[ is]] the processor 220 and the network Column 4, line 25, please amend as shown:
   of[[ is]] network topology), and in response to a needed route to Column 6, line 17, please amend as shown:
   Function 0"<draft-ietf-roll-of[[ ]]0-11> by Thubert (May 5, Signed and Sealed this  
Eighth Day of July, 2014

Michelle K. Lee  
*Deputy Director of the United States Patent and Trademark Office*